May 31, 1966 C. LOYER ETAL 3,253,853
ELECTRIC GRAB FOR CARTRIDGES
Filed Dec. 12, 1963 2 Sheets-Sheet 1

INVENTORS
CLAUDE LOYER
PIERRE MAUGUEN
JACQUES PINAULT
BY Bacon & Thomas
ATTORNEYS

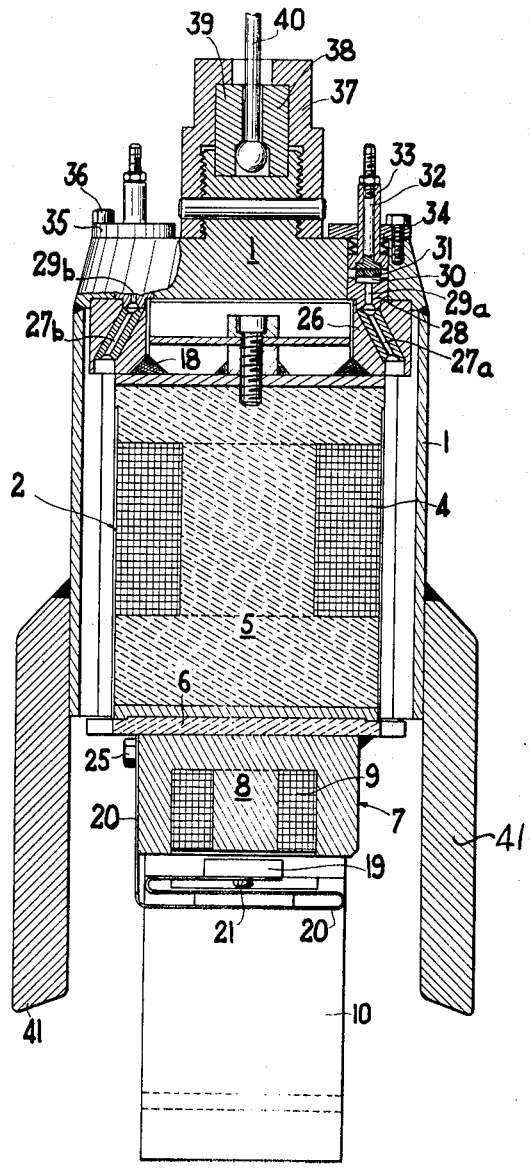

United States Patent Office 3,253,853
Patented May 31, 1966

3,253,853
ELECTRIC GRAB FOR CARTRIDGES
Claude Loyer, Paris, Pierre Mauguen, Montfermeil, and Jacques Pinault, Paris, France, assignors to Groupement Atomique Alsacienne Atlantique, Seine, France
Filed Dec. 12, 1963, Ser. No. 330,079
Claims priority, application France, Dec. 20, 1962, 919,346
7 Claims. (Cl. 294—88)

The present invention relates to a handling grab which is more especially intended for the handling of fuel cartridges, yokes, end-caps or other similar elements of nuclear reactors, especially high-temperature reactors, wherein the fuel cartridges are stacked either in vertical channels or in horizontal channels.

In the handling grabs or like devices which have been employed up to the present time, there has usually been employed in order to produce the radial displacement of the grappling tongs and the locking or unlocking of the various safety devices, an assembly of mechanical components which are movable or articulated relatively to each other and which inevitably produce friction, either as a result of rolling or sliding within the grab body.

Moreover, in the case which is more especially considered in which the apparatus is intended to operate in a high-temperature reactor, the use of lubricating oil or grease is necessarily excluded, by reason on the one hand of the temperature itself and on the other hand of the action of ionizing radiation which usually causes damage to lubrication products. The effective operation of the apparatus is thus liable to be rapidly impaired by jamming or seizure which can occur during the relative movements of the various mechanical components.

The object of the present invention is to overcome the above-mentioned disadvantages by means of an electrically operated apparatus of particularly simple design which works solely on the principle of elastic deformation of metallic strips without lubrication of any kind. A further object of the invention is to make the use of such an apparatus completely reliable, especially by preventing any untimely closing or opening movements of the grappling tongs as the various handling operations are being performed.

The apparatus in accordance with the invention is characterized in that it comprises a grab body and an electromagnet axially supported within said grab body, two grappling tongs which are freely mounted within said grab body on each side of said electromagnet and which are each made integral with a member of non-magnetic material to which is attached a slightly arcuate flexible spring-blade which couples the two tongs together, the application of voltage to the electromagnet having the effect of attracting the tongs and producing the lateral pivotal movement of said tongs as a result of the deformation of said flexible blade.

The radial movements of the tongs within the space formed between the grab body and the electromagnet are thus effected solely as a result of momentary deformation of the coupling blade whilst all friction is thereby eliminated, the mechanical characteristics of said blade being so chosen that, when no voltage is applied to the electromagnet, the tongs revert automatically to their rest position.

In a preferred form of embodiment of the invention, the coupling blade is immobilized in the central portion thereof and rigidly maintained by means of screws or like means of a suitable type which are applied against a mounting block carried by the electromagnet in order to provide a better distribution of the efforts in the blade and to obtain a perfectly symmetrical movement of the tongs.

In accordance with another characteristic feature of the invention, the grab can preferably be fitted with a locking system which serves to lock the tongs in the rest position thereof in such manner as to forestall any unforeseen movement of these latter during the various operations involved in transferring a fuel cartridge, for example. For this purpose, the grab comprises a second electromagnet or so-called interlocking electromagnet and a magnetic pallet supported on one end of a second spring blade which is rigidly fixed at the other end thereof, in such manner that, when no voltage is applied to the second electromagnet, said second blade ensures that the tongs are maintained in the outwardly displaced position by causing said pallet to engage within a suitably dimensioned recess which is formed between two shouldered portions respectively provided in each of said tongs.

The two electromagnets are preferably supplied with electric current through two separate lead wires, the return current having a common ground (earth). However, it is possible to put the grab into operation by supplying current to the two electromagnets simultaneously in parallel provided of course that the response time of the interlocking electromagnet and consequently of the magnetic pallet is distinctly shorter than the response time of the main electromagnet. Moreover, the magnetic circuit of the main electromagnet is preferably divided into two sections which are separated from each other by a plate of magnetic material or simply by air. This arrangement makes it possible to make use of a common coil in respect of both circuits of said electromagnet while preventing magnetic saturation of the central core and consequently an induction drop in the air-gap of one of the sections when the other section is already closed as a result of the attraction of the corresponding tong.

Other characteristic features of the invention which relate in particular to the design of the passages and connections for the supply of electric current to the coils of the electromagnets will be brought out more clearly by the following description of one example of embodiment which is given by way of indication and not in any limiting sense.

In the accompanying drawings:

FIG. 2 is another axial sectional view of the same grab, taken along the line II—II of FIG. 1.

Figure 1:
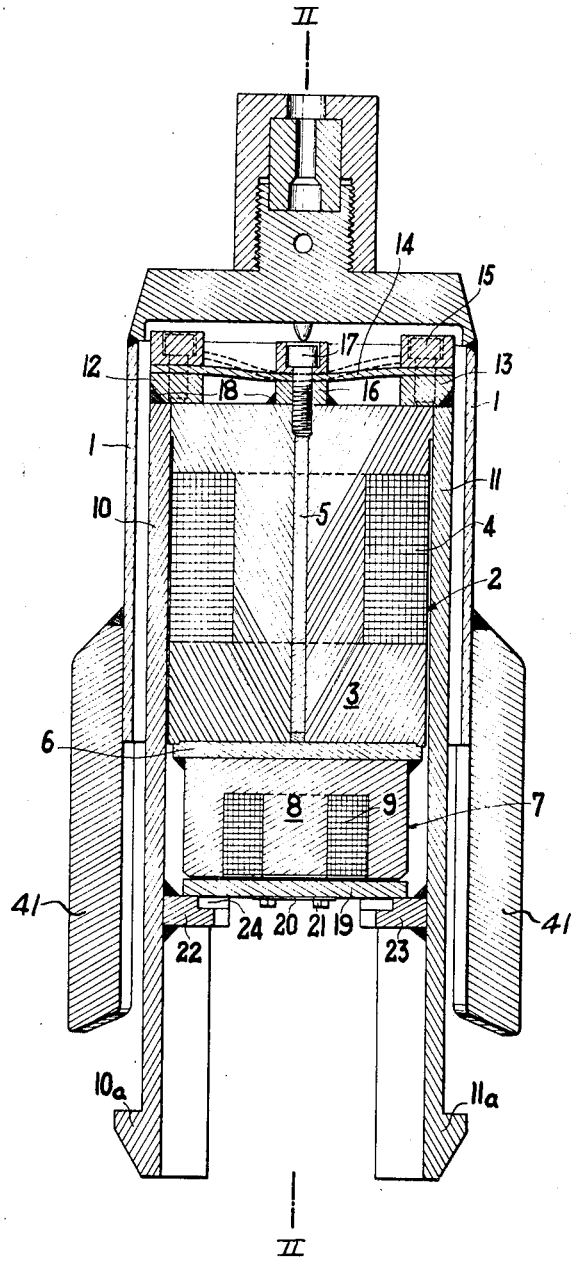
FIG. 1 is a sectional view of a handling grab as constructed in accordance with the invention.

As can be seen from the first of these figures, the grab comprises a body 1 having a substantially cylindrical shape, within the interior of which is fixed axially an electromagnet 2 composed of a frame 3 and a coil 4. The frame 3 is formed of two identical sections which are fabricated of mild steel, for example, and which are separated from each other by a plate 5 of non-magnetic metal.

On the electromagnet 2 which will be referred to in the description hereinafter as the main electromagnet, there is fixed a second electromagnet 7 or so-called interlocking electromagnet, a non-magnetic separation plate 6 being advantageously provided between said electromagnets so as to isolate their respective circuits. The electromagnet 7 also comprises a frame 8 and coil 9.

The two grappling tongs of the grab which are respectively designated by the reference numerals 10 and 11 are mounted in the interior of the body 1 on each side of the main electromagnet 2. Each tong is provided at the bottom with a nose 10a or 11a which makes it possible in particular for the grab to lay hold of a nuclear fuel cartridge (which has not been shown in the drawings) or any like component by engagement of said two noses within a circular groove which is formed in said cartridge. In the mode of execution considered, the engagement of the grab is therefore effected by lateral outward movement of the tongs, it being understood that this design is not limitative in any respect and that it would be possible, as will become more readily apparent hereinafter, to consider a condition of operation of the grab wherein the tongs are permitted to move in the reverse direction.

The tongs 10 and 11 are respectively extended at the top portion thereof by two members 12 and 13 of nonmagnetic material which is adapted to bear against the top face of the main electromagnet 2. The two members 12 and 13 are coupled together by a metallic blade 14 which is secured at each end by means of screws such as the screw 15. As can be seen from FIG. 1, the said blade has a profile which is very slightly curved in the shape of a parabola and which is so designed as to exert on each of its extremities, that is to say in fact on the members 12 and 13 to which said extremities are secured, an upwardly directed force which produces the outward displacement of the tongs when no voltage is applied to the electromagnet 2. The central portion of the strip 14 is held applied against a block 16 integral with the top face of the electromagnet 2 by means of a clamping screw 17, the extension of which penetrates within the separation plate 5. Finally the different elements mentioned above (tongs 10 and 12, block 16, electromagnet 2, etc. . . .) are respectively assembled together by means of spot welds such as 18 which are suitably spaced at intervals so as not to interfere with the radial movement of the tongs 10 and 11 within the space which is formed between the body 1 of the grab and the lateral faces of the main electromagnet 2.

In accordance with the invention, the grab is also fitted with a locking pallet 19 which is supported by and attached to a spring blade 20 by means of screws such as the screw 21. Provision is also made in proximity to the pallet 19 for two shoulders 22 and 23 which are formed on each of the tongs 10 and 11 and which are provided in that portion thereof which is directed towards the axis of the grab with a circular recess 24. Said recess forms a housing for the pallet when the tongs are located in the outwardly displaced position (namely the position which corresponds to the locking of the noses 10a and 11a formed at the extremities thereof over a cartridge).

FIG. 2 serves to define certain structural details of the grab which has just been described and in particular the attachment of the spring blade 20 which supports the pallet 19 to the frame 8 of the electromagnet 7 by means of a screw 25, as well as the arrangement provided for permitting the electrical connection of the coils 4 and 9 of the electromagnets. A ring 26 is mounted at the top of the body 1 and is provided with two bores 27a and 27b which, with interposition of suitable insulation means, form a passageway for the electrical wire which effects the connection between the respective coils of the electromagnets 2 and 7. There is fitted into the top portion of the ring 26 a second insulating ring 28 which is in turn provided with two bores 29a and 29b which form extensions of the bores 27a and 27b, each of the corresponding lead wires being brought out into a small cavity 30 within which said wire is wound into a coil. There also corresponds to each wire a conducting pastille 31 forming one piece with a conducting rod 32 which is isolated from the grab body 1 by a sleeve 33, said pastille being firmly applied against the wire within the cavity 30 by means, for example, of flexible dished washers 34 of the "Belleville" type. The combined assembly as described above is secured to the grab body by means of discs such as the disc 35 which are held in position by means of screws 36.

The grab is fitted at the top portion thereof with a detachable system which permits the fastening thereof on a handling cable. To this end, said grab comprises a nut 37 which is screwed on the body 1, thereby clamping two half-shells 38 and 39 by means of which the grab is fastened to the cable 40. Finally, the grab is fitted laterally with four fins or lateral upright members 41 which permit the suitable guiding and positioning of the grab during the various handling operations.

The operation of the apparatus will readily be apparent from the foregoing. It is assumed in the sectional view of FIG. 1 that the two electromagnets 2 and 7 are energized through the electrical conductor rods 32. The connecting blade 14 is subjected to a slight deformation which results from the attraction of the two tongs by the main electromagnet; the members 12 and 13 are thus applied against the electromagnet 2, the tongs 10 and 11 which are integral therewith being in the inwardly withdrawn position. (The position occupied by the spring blade 14 when the electromagnet 2 is not energized has been shown in broken lines.) Before this, on account of the shorter response time of the electromagnet 7, the pallet 19 is attracted against the frame 8 and thereby freed from the recess 24, thus no longer blocking the tongs in their initial outwardly-open position.

As soon as the current no longer flows through the coils of the electromagnets, the tongs 10 and 11 are immediately displaced outwards under the action of the blade 14 while the pallet 19 penetrates under the action of the blade 20 inside the recess 24, thereby maintaining the tongs in the outwardly displaced position.

It will be understood that the invention is not limited in any respect to the form of embodiment which has been described and illustrated and to the field of application which has been more especially contemplated, which have been given solely by way of example. In particular, it would be possible to consider other alternative forms wherein the number of tongs could be greater than two, the shape of the flexible blade which ensures the coupling thereof being also different.

What we claim is:

1. Electric grab for cartridges, characterized in that it comprises a grab body and an electromagnet axially supported within said grab body, two grappling tongs which are freely mounted within said grab body on each side of said electromagnet and which are each made integral with a member of non-magnetic material to which is attached a slightly arcuate flexible spring-blade which couples the two tongs together, the application of voltage to the electromagnet having the effect of attracting each tong and producing the lateral pivotal movement of said tongs as a result of the deformation of said flexible blade.

2. Electric grab for cartridges in accordance with claim 1, characterized in that the flexible blade is immobilized in the central portion thereof by at least one screw or other like means against a mounting block carried by the electromagnet.

3. Electric grab for cartridges in accordance with claim 1, characterized in that it comprises a safety system constituted by a second electromagnet or so-called interlocking electromagnet and a magnetic pallet supported on one end of a second spring blade which is rigidly fixed at the other end thereof, in such a manner that, when no voltage is applied to the interlocking electromagnet, said second blade ensures that the tongs are maintained in the outwardly displaced position by causing said pallet to engage within a suitably dimensioned recess which is formed between two shouldered portions respectively provided in each of said tongs.

4. Electric grab for cartridges in accordance with claim 3, characterized in that the two electromagnets are supplied with electric current through two separate lead wires, the return current having a common ground.

5. Electrical grab for cartridges in accordance with claim 3, characterized in that the two electromagnets are supplied in parallel.

6. Electrical grab for cartridges in accordance with claim 4, characterized in that the wires providing an electrical connection between the coils of the electromagnets are joined to conductor rods which are isolated from the grab body and which are applied by means of a conducting pastille against the ends of said wires which are wound into a coil.

7. Electrical grab for cartridges in accordance with claim 1, characterized in that the magnetic circuit of the electromagnet which attracts the tongs is divided into two sections which are separated by a plate of non-magnetic material or by air.

References Cited by the Examiner

UNITED STATES PATENTS

| | | | |
|---|---|---|---|
| 529,776 | 11/1894 | Brown | 294—93 X |
| 3,165,349 | 1/1965 | Costes | 294—97 |

GERALD M. FORLENZA, *Primary Examiner.*

SAMUEL F. COLEMAN, *Examiner.*